United States Patent
Liu et al.

(10) Patent No.: US 11,760,675 B2
(45) Date of Patent: Sep. 19, 2023

(54) SYSTEM AND METHOD FOR TREATING PRINTED CIRCUIT BOARD (PCB) WASTEWATER

(71) Applicant: Greentech Environment Co., Ltd., Beijing (CN)

(72) Inventors: Mu Liu, Beijing (CN); Zehua Li, Beijing (CN); Huiming Han, Beijing (CN); Xiaofeng Lin, Beijing (CN); Yingqiang Su, Beijing (CN); Mengyuan Duan, Beijing (CN); Cong Xiao, Beijing (CN); Kai Sun, Beijing (CN); XiKun Zhu, Beijing (CN)

(73) Assignee: Greentech Environment Co., Ltd., Beijing (CN)

(*) Notice: Subject to any disclaimer, the term of this patent is extended or adjusted under 35 U.S.C. 154(b) by 0 days.

(21) Appl. No.: 18/193,685

(22) Filed: Mar. 31, 2023

(65) Prior Publication Data

US 2023/0234871 A1    Jul. 27, 2023

(30) Foreign Application Priority Data

Jul. 15, 2022    (CN) .......................... 202210828854.3

(51) Int. Cl.
  *C02F 9/00*     (2023.01)
  *C02F 1/52*     (2023.01)
  *C02F 1/62*     (2023.01)
  *C02F 1/72*     (2023.01)
  *C02F 3/30*     (2023.01)
  (Continued)

(52) U.S. Cl.
  CPC .................. *C02F 9/00* (2013.01); *C02F 1/52* (2013.01); *C02F 1/586* (2013.01); *C02F 1/62* (2013.01); *C02F 1/725* (2013.01); *C02F 3/30* (2013.01); *C02F 2101/18* (2013.01);
  (Continued)

(58) Field of Classification Search
  None
  See application file for complete search history.

(56) References Cited

FOREIGN PATENT DOCUMENTS

| CN | 102639450 A | 8/2012 |
|---|---|---|
| CN | 102786180 A | 11/2012 |

(Continued)

OTHER PUBLICATIONS

Huicheng Liu et al.,"Design and Operation of Board Wastewater Treatment Project", China Water & Wastewater, vol. 22, No. 2, Jan. 2006, pp. 65-67.

(Continued)

*Primary Examiner* — Clare M Perrin (57) ABSTRACT

A system for treating printed circuit board wastewater (PCB) includes a production system, a pretreatment system, a biochemical system, a recovery system and a concentrated water treatment system. The production system is configured for producing process water and auxiliary water from tap water. The pretreatment system is configured to pretreat different wastewater samples separately. The biochemical system is configured to decompose the pretreated wastewater. The recovery system is configured to treat wastewater from the pretreatment system and the biochemical system to obtain process water and feed concentrated water to the concentrated water treatment system. The concentrated water treatment system is configured to treat the concentrated water to meet a discharge standard. A treatment method for the PCB wastewater is also provided.

5 Claims, 3 Drawing Sheets

(51) Int. Cl.
*C02F 1/58* (2023.01)
*C02F 101/18* (2006.01)
*C02F 101/20* (2006.01)
*C02F 103/34* (2006.01)

(52) U.S. Cl.
CPC .... *C02F 2101/20* (2013.01); *C02F 2103/346* (2013.01); *C02F 2209/06* (2013.01); *C02F 2209/08* (2013.01)

(56) References Cited

FOREIGN PATENT DOCUMENTS

| | | | |
|---|---|---|---|
| CN | 108409003 A | 8/2018 | |
| CN | 112441683 A | 3/2021 | |
| CN | 13185059 A | 7/2021 | |
| WO | 2017103479 A1 | 6/2017 | |

OTHER PUBLICATIONS

Susu Luo et al.,"Circuit board production wastewater treatment engineering example", Industrial Water & Wastewater, vol. 45, No. 6, Dec. 2014, pp. 77-79.

SYSTEM AND METHOD FOR TREATING PRINTED CIRCUIT BOARD (PCB) WASTEWATER

CROSS-REFERENCE TO RELATED APPLICATIONS

This application claims the benefit of priority from Chinese Patent Application No. 202210828854.3, filed on Jul. 15, 2022. The content of the aforementioned application, including any intervening amendments thereto, is incorporated herein by reference in its entirety.

TECHNICAL FIELD

This application relates to water treatment, and more particularly to a system and method for treating printed circuit board (PCB) wastewater.

BACKGROUND

Among the electronics industry, the manufacturing of printed circuit boards (PCBs) requires large water consumption. Almost every procedure of the PCB production involves the use of tap water and chemical reagent tank, and multiple overflow water washes are performed following each chemical reagent tank, resulting in the generation of a wide variety of wastewater varying in quality, quantity, and composition. Accordingly, many treatment measures are required. Individual streams of the production wastewater after the diversion will flow into different wastewater storage tanks and undergo different pretreatment processes. The wastewater is finally treated and discharged through an integrated treatment facility.

The PCB production process mainly includes dry treatment and wet treatment. The dry treatment mainly includes cutting, drilling, and trimming, which produce solid waste, such as leftover material and drilling powder, most of which are copper-containing valuable wastes. The wet treatment includes more than 20 processes such as roughening, activation, oxidation, etching, electroplating, solder stripping, nickel gold immersion, and multiple rinsing, which lead to the generation of a large amount of waste liquid and wastewater containing non-ferrous metal pollutants such as copper, nickel and tin, and Class-I and II pollutants such as waste acid, waste alkali, fluoride, and cyanide. In view of the complex production process and diverse pollution sources, for meeting the discharge standard for a long term, large consumption of labor and financial resources is required. The wastewater treatment is a systematic project, in which the production process and demand should be fully taken into consideration to realize the efficient coupling between the production process and wastewater treatment.

SUMMARY

In order to solve the above technical problems in the prior art, this application provides a system and method for treating printed circuit board (PCB) wastewater.

In a first aspect, this application provides a system for treating printed circuit board (PCB) wastewater, including:
a production system;
a pretreatment system;
a biochemical system;
a recovery system;
a concentrated water treatment system; and
a living system;

wherein the production system is configured to produce process water and auxiliary production water from tap water;
the pretreatment system is configured to pretreat wastewater;
the biochemical system is configured to decompose pretreated wastewater;
the recovery system is configured to treat wastewater from the pretreatment system and the biochemical system to obtain the process water, treat waste to form concentrated water, and discharge the concentrated water into the concentrated water treatment system;
the concentrated water treatment system is configured to treat the concentrated water to meet a discharge standard;
an output end of the production system and an output end of the living system are connected to a first input end of the pretreatment system; a first output end of the pretreatment system is connected to an input end of the biochemical system; and an output end of the biochemical system is connected to a first input end of the recovery system;
a second output end of the pretreatment system is connected to a second input end of the recovery system; a first output end of the recovery system is connected to the concentrated water treatment system; and a second output end of the recovery system is connected to an input end of the production system; and
a first output end of the concentrated water treatment system is configured for wastewater discharge; a second output end of the concentrated water treatment system and a third output end of the recovery system are connected to a second input end of the pretreatment system.

This application further provides a method for treating printed circuit board wastewater, including:
(S1) collecting production wastewater from a production system; and collecting domestic wastewater from a living system;
(S2) pretreating the production wastewater and the domestic wastewater separately to obtain primary treated wastewater; and allowing the primary treated wastewater to enter a biochemical system or a recovery system;
(S3) treating the primary treated wastewater by the biochemical system to obtain secondary treated wastewater, and collecting the secondary treated wastewater to the recovery system;
(S4) treating the secondary treated wastewater by the recovery system to obtain process water and domestic water, and generate concentrated water at the same time; wherein the process water enters the production system for use; and the domestic water enters the living system for use; and
(S5) allowing the concentrated water to enter a concentrated water treatment system for treatment to meet a discharge standard.

Compared to the prior art, this application has the following beneficial effects.

This application proposes a pretreatment process including production wastewater and cleaning wastewater, a biochemical process for removing organic matter and ammonia nitrogen, a reclaimed water process for graded recycling, and a concentrated water treatment process generated in this process. According to the characteristics of different-level water, the process is carried out to achieve a recovery rate of about 70% of the reclaimed water. The process also achieves economical treatment and reliable management, at the same time expands the corresponding environmental capacity, and effectively reduces emissions. Through the overall centralized treatment of wastewater, the chemicals and personnel of the treatment industry can be overall arranged, and the operating cost can be effectively reduced, while improving management efficiency and water supply reliability.

BRIEF DESCRIPTION OF THE DRAWINGS

The drawings herein are incorporated into the description and form a part of the description, illustrating embodiments of the present disclosure, and together with the description are used to explain the principles of the present disclosure.

In order to illustrate the embodiments of the present disclosure or the technical solutions in the prior art more clearly, the drawings required in the embodiments or the prior art will be briefly described below. Obviously, for those skilled in the art, other drawings may also be obtained without paying creative efforts according to the drawings provided herein.

DETAILED DESCRIPTION OF EMBODIMENTS

The present disclosure will be further described below with reference to the embodiments and accompanying drawings to facilitate the understanding of the above objects, features and advantages of the present disclosure. It should be noted that embodiments of the present disclosure and the features therein may be combined with each other in the case of no contradiction.

The detailed description set forth below is intended to help understand the present disclosure, but the present disclosure may be implemented in other ways different from those described herein. Obviously, described below are merely some embodiments of the disclosure, not all embodiments.

A system for treating printed circuit board (PCB) wastewater provided herein contains pretreatment of production wastewater and cleaning wastewater, a biochemical treatment system for removing organic matter and ammonia nitrogen, a reclaimed water system for graded recycling, and a concentrated water treatment system generated in the treatment process. Considering the different product types, production processes and scales of different enterprises, the system of treating the printed circuit board wastewater is built by classified collection, pretreatment by different quality, comprehensive treatment and graded reuse, which mainly includes a production system, a pretreatment system, a biochemical system, a recovery system, and a concentrated water treatment system.

Figure 1:
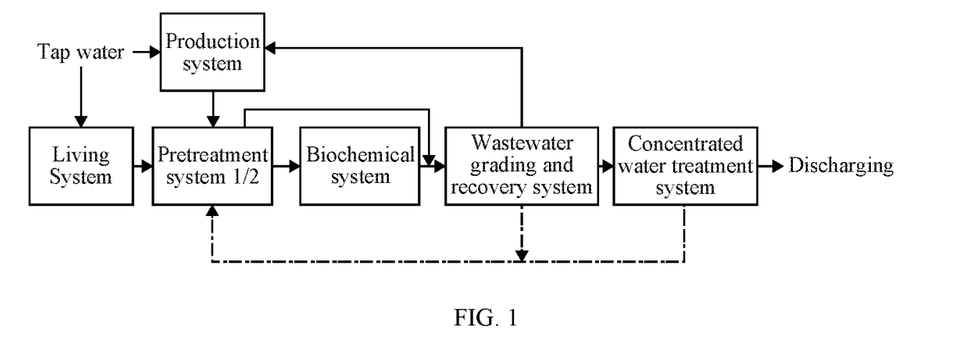
FIG. 1 is a schematic diagram showing a treatment system of printed circuit board wastewater according to one embodiment of the present disclosure.

As shown in FIG. 1, in this embodiment, the system includes the production system, the pretreatment system, the biochemical system, the recovery system, and the concentrated water treatment system.

Specifically, the production system is configured to produce process water and auxiliary production water from tap water. The pretreatment system is configured to pretreat wastewater. The biochemical system is configured to decompose pretreated wastewater. The recovery system is configured to treat wastewater from the pretreatment system and the biochemical system to obtain the process water, treat waste to form concentrated water, and discharge the concentrated water into the concentrated water treatment system. The concentrated water treatment system is configured to treat the concentrated water to meet a discharge standard.

The connection of components of the system is illustrated as follows.

An output end of the production system and an output end of the living system are connected to a first input end of the pretreatment system.

A first output end of the pretreatment system is connected to an input end of the biochemical system.

An output end of the biochemical system is connected to a first input end of the recovery system.

A second output end of the pretreatment system is connected to a second input end of the recovery system.

A first output end of the recovery system is connected to the concentrated water treatment system.

A second output end of the recovery system is connected to an input end of the production system.

A first output end of the concentrated water treatment system is configured for wastewater discharge. A second output end of the concentrated water treatment system and a third output end of the recovery system are connected to a second input end of the pretreatment system.

The main connection interface of the treatment system is described in the disclosure.

The pretreatment system has the first input end, the second input end, the first output end, and the second output end.

The recovery system has the first input end, the second input end, the first output end, the second output end and the third output end.

The concentrated water treatment system has the first output and the second output.

In addition to the above interfaces and connection methods, the system in this disclosure further includes other connection methods and interfaces.

In the system of this disclosure, the living system is mainly supplied with tap water. The domestic sewage generated by the living area of the enterprise is pretreated by filtration and sedimentation, and then enters the biochemical system with the production wastewater.

The production system includes a main production process and auxiliary facilities. The level of water used in the main production process are high, water used in the main production process is electronic-grade industrial water, and the water consumption is large. The level of water used in the auxiliary facilities are relatively low. Wastewater from the production system enters the pretreatment system. Wastewater with heavy metals as the main pollutants can enter the recovery system after simple pretreatment, and some wastewater containing organic matter needs to enter the biochemical system after pretreatment.

In the recovery system, the water used for the different quality requirements required by the production system is produced and fed into the production system.

At the same time, a small amount of high salinity concentrated water containing refractory organic matter is produced and fed to the concentrated water treatment system to treat and discharge the concentrated water after reaching the discharge standard.

The production system also needs the tap water as a renewal water.

The recovery system and the concentrated water treatment system need maintenance, for example, normal cleaning and regeneration of the system, and the produced wastewater can be returned to the pretreatment system.

Figure 2:
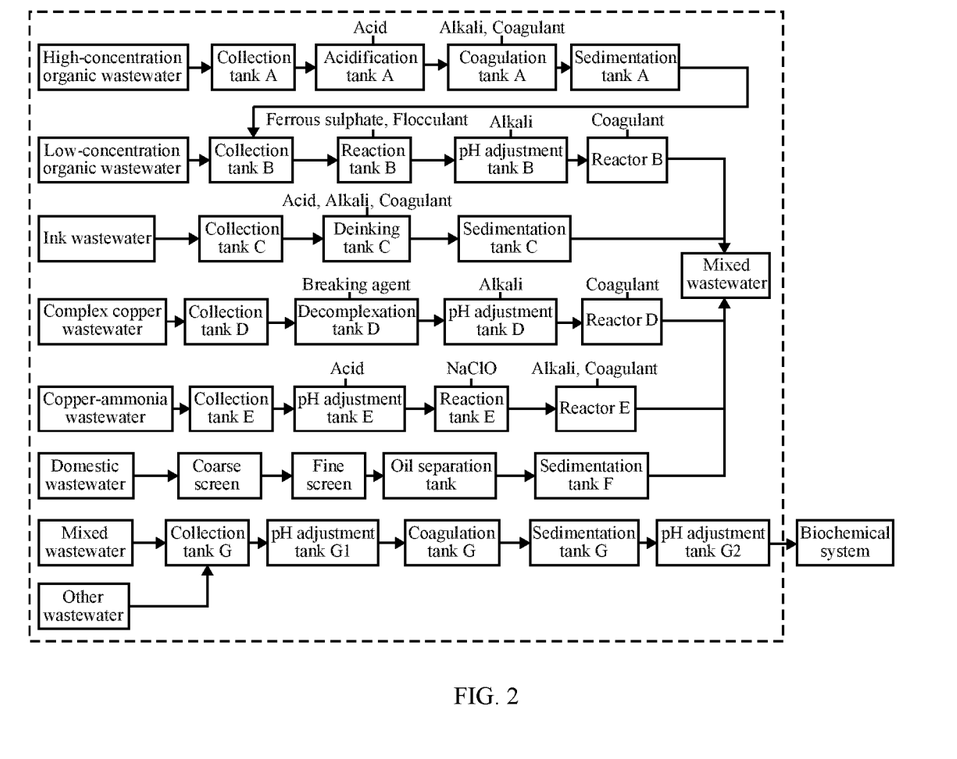
FIG. 2 is a schematic diagram showing a first pretreatment subsystem according to one embodiment of the present disclosure.
Figure 3:
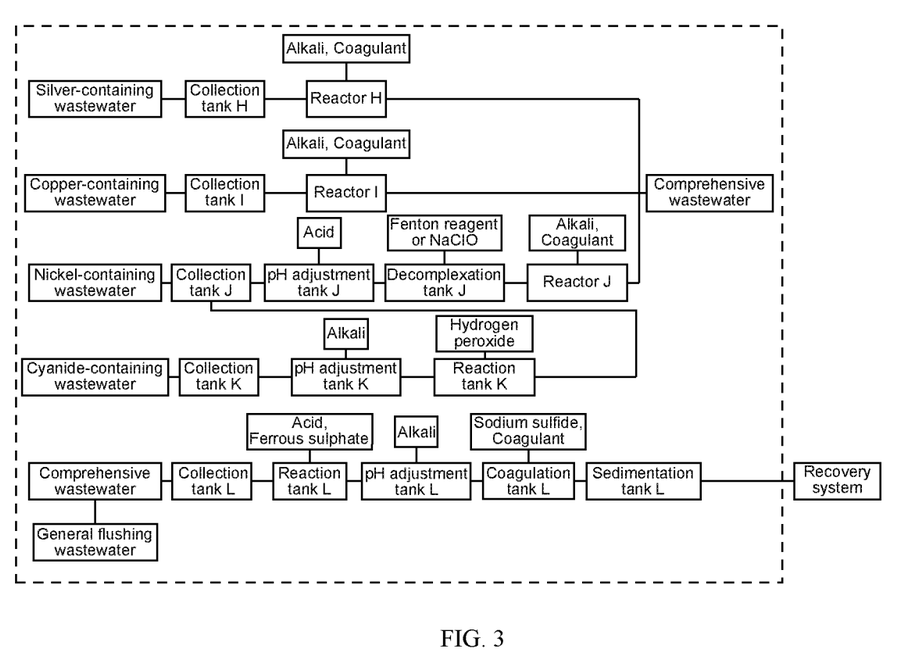
FIG. 3 is a schematic diagram showing a second pretreatment subsystem according to one embodiment of the present disclosure.

The pretreatment system includes a first pretreatment subsystem 1 and a second pretreatment subsystem 2. The first pretreatment subsystem 1 includes multiple units such as a high-concentration organic wastewater, a low-concentration organic wastewater, an ink wastewater, a complex copper wastewater, a copper-ammonia wastewater, and a domestic wastewater, which are mixed to form the mixed wastewater after treatment. The second pretreatment subsystem 2 includes multiple units such as a copper-containing wastewater, a nickel-containing wastewater, a cyanide-containing wastewater, and a silver-containing wastewater, which are mixed to form mixed wastewater after treatment. The above wastewater first needs to be collected and diverted separately for pretreatment.

Specifically, the first pretreatment subsystem 1 includes a first organic wastewater treatment unit, a second organic wastewater treatment unit, an ink wastewater treatment unit, a complex copper wastewater treatment unit, a copper-ammonia wastewater treatment unit, a domestic wastewater treatment unit, and a first mixed wastewater treatment unit. An output end of the first organic wastewater treatment unit is connected to an input end of the second organic wastewater treatment unit. An output end of the second organic wastewater treatment unit, an output end of the ink wastewater treatment unit, an output end of the complex copper wastewater treatment unit, an output end of the copper-ammonia wastewater treatment unit, and an output end of the domestic wastewater treatment unit are connected to an input end of the first mixed wastewater treatment unit. An output end of the first mixed wastewater treatment unit is connected to the input end of the biochemical system.

The first organic wastewater treatment unit is configured to treat high-concentration organic wastewater to reduce chemical oxygen demand (COD) of the high-concentration organic wastewater to 800~2000 mg/L. The high-concentration organic wastewater refers to the wastewater with COD of 2000 mg/L or above discharged paper, leather and food industries. The second organic wastewater treatment unit is configured to treat low-concentration organic wastewater to reduce COD of the low-concentration organic wastewater to 100~500 mg/L. The ink wastewater treatment unit is configured to treat ink wastewater to reduce COD of the ink wastewater to 400~800 mg/L.

The complex copper wastewater treatment unit is configured to treat complex copper wastewater to reduce copper content of the complex copper wastewater to 0.5 mg/L. The copper-ammonia wastewater treatment unit is configured to treat copper-ammonia wastewater to reduce copper content of the copper-ammonia wastewater to 0.5 mg/L.

The domestic wastewater treatment unit is used to treat domestic wastewater.

In following embodiment of the present disclosure, the schematic diagram of the structure of the first pretreatment subsystem 1 is shown in FIG. 2.

The first organic wastewater treatment unit includes a collection tank A, an acidification tank A, a coagulation tank A, and a sedimentation tank A connected in sequence.

The second organic wastewater treatment unit includes a collection tank B, a reaction tank B, a pH adjustment tank B, and a reactor B connected in sequence; and the reactor B is configured for coagulation and precipitation.

The ink wastewater treatment unit includes a collection tank C, a deinking tank C, and a sedimentation tank C connected in sequence.

The complex copper wastewater treatment unit includes a collection tank D, a decomplexation tank D, a pH adjustment tank D, and a reactor D connected in sequence; and the reactor D is configured for coagulation and precipitation.

The copper-ammonia wastewater treatment unit includes a collection tank E, a pH adjustment tank E, a reaction tank E, and a reactor E connected in sequence; and the reactor E is configured for coagulation and precipitation.

The domestic wastewater treatment unit includes a coarse screen, a fine screen, an oil separation tank, and a sedimentation tank F connected in sequence.

The first mixed wastewater treatment unit includes a collection tank G, a pH adjustment tank G1, a coagulation tank G, a sedimentation tank G, and a pH adjustment tank G2 connected in sequence.

The second pretreatment subsystem 2 includes a copper-containing wastewater treatment unit, a nickel-containing wastewater treatment unit, a cyanide-containing wastewater treatment unit, a silver-containing wastewater treatment unit, and a second mixed wastewater treatment unit. An output end of the cyanide-containing wastewater treatment unit is connected to an input end of the nickel-containing wastewater treatment unit. An output end of the copper-containing wastewater treatment unit, an output end of the nickel-containing wastewater treatment unit, and an output end of the silver-containing wastewater treatment unit are connected to an input end of the second mixed wastewater treatment unit. An output end of the second mixed wastewater treatment unit is connected to the second input end of the recovery system.

The cyanide-containing wastewater treatment unit is configured to treat cyanide-containing wastewater to reduce $CN^-$ content to 0.05 mg/L or less.

The nickel-containing wastewater treatment unit is configured to treat nickel-containing wastewater to reduce $Ni^{2+}$ content to 0.075 mg/L or less.

The copper-containing wastewater treatment unit is configured to treat copper-containing wastewater to reduce $Cu^{2+}$ content to 0.5 mg/L or less.

The silver-containing wastewater treatment unit is configured to treat silver-containing wastewater to reduce $Ag^+$ content to 0.075 mg/L or less.

A schematic diagram of the second pretreatment subsystem 2 is shown in FIG. 3.

The cyanide-containing wastewater treatment unit includes a collection tank K, a pH adjustment tank K, and a reaction tank K connected in sequence; and the reaction tank K is connected to the collection tank J.

The nickel-containing wastewater treatment unit includes a collection tank J, a pH adjustment tank J, a decomplexation tank J, and a reactor J connected in sequence.

The silver-containing wastewater treatment unit includes a collection tank H and a reactor H connected in sequence.

The copper-containing wastewater treatment unit includes a collection tank I and a reactor I connected in sequence.

The second mixed wastewater treatment unit includes a collection tank L, a reaction tank L, a pH adjustment tank L, a coagulation tank L, and a sedimentation tank L connected in sequence.

Figure 4:
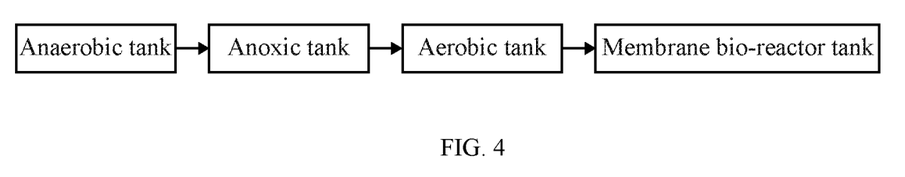
FIG. 4 structurally illustrates a biochemical system according to one embodiment of the present disclosure.

A structure of the biochemical system is schematically shown in FIG. 4. The biochemical system includes an anaerobic unit, an anoxic unit, an aerobic unit, and a membrane bio-reactor (MBR) tank connected in sequence.

In the anaerobic unit, through anaerobic hydrolysis, macromolecular organic matter is decomposed into small molecule organic matter, and refractory organic matter is decomposed into easily-degradable organic matter. In the aerobic unit, organic matter is broken down using activated sludge to remove pollutants from the water. The solid suspended solids (SS) and macromolecular organic matter in the water are intercepted by the MBR tank to improve the nitrification effect.

MBR, also known as Membrane Bio-Reactor, is a new water treatment technology that combines membrane separation unit and biological treatment unit. The MBR tank is followed by a one-step ultrafiltration treatment.

Figure 5:
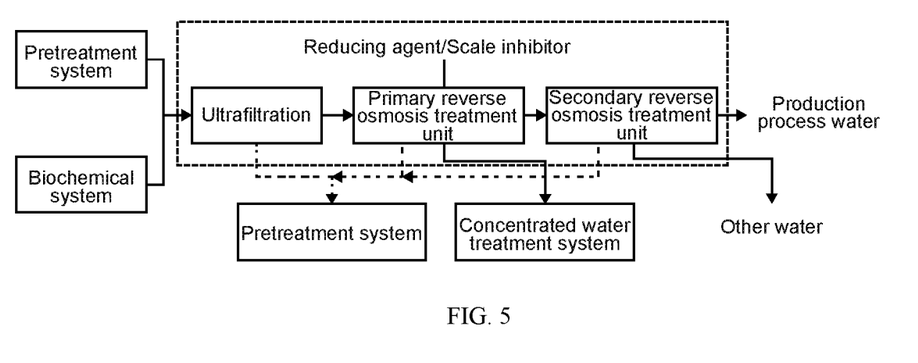
FIG. 5 structurally shows a recovery system according to one embodiment of the present disclosure.

In an embodiment, referring to FIG. 5, the structure of the recovery system is schematically shown. The recovery system includes a filtration unit, a first ion exchange unit and a reverse osmosis treatment unit.

Preferably, the filtration unit refers to ultrafiltration unit, such as ultrafiltration membrane devices, inlet pumps, micro-flocculation devices and other cleaning equipment. Due to the presence of flocs that cannot be completely precipitated in the effluent of the pretreatment system, and the possible breakage and fracture of the MBR membrane in the biochemical system, the effluent of the biochemical system cannot meet the inlet standard of the recovery system. The effluents of the pretreatment system and biochemical system are lifted into the ultrafiltration treatment device to ensure that the silting density index (SDI) value of the influent water in the reverse osmosis system reaches ≤3. The recovery rate of ultrafiltration unit reaches ≥90%.

The reverse osmosis treatment unit further includes a primary reverse osmosis treatment unit and a secondary reverse osmosis treatment unit.

The ultrafiltration water enters the primary reverse osmosis treatment unit and is filtered through the ordinary brackish water reverse osmosis member. The water produced by the primary reverse osmosis treatment unit enters the secondary reverse osmosis treatment unit. A low-pressure reverse osmosis member is used for a graded treatment of the produced water, and the secondary reverse osmosis recovery rate is configured for 60~65%. The pure water produced enters the production system, and the concentrated water can enter the storage tank as water with low water quality requirements such as ground flushing, waste gas absorption and cooling tower replenishment.

Figure 6:
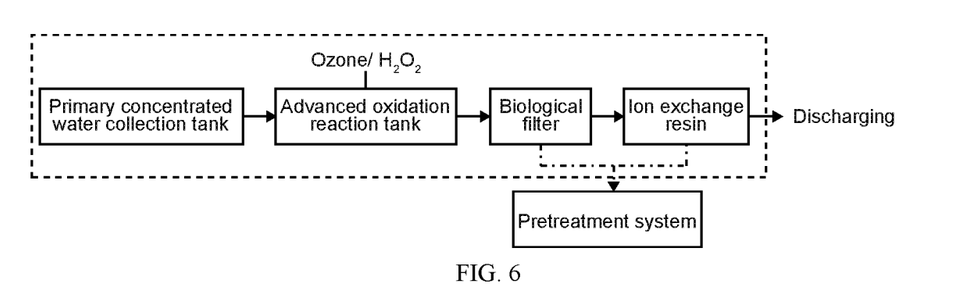
FIG. 6 structurally shows a concentrated water treatment system according to one embodiment of the present disclosure.

The concentrated water treatment system is schematically shown FIG. 6. The concentrated water treatment system includes a concentrated water collection unit, an oxidation reaction unit, a biological filtration unit and a second ion exchange unit connected sequentially.

The concentrated water collection unit collects concentrated water, enters the oxidation reaction unit and reacts with ozone, converts the difficult biodegradable organic matter into small molecule matter that is easily biodegradable, and improves the biodegradability of wastewater. The end of the oxidation reaction unit is provided with oxidation-reduction potential (ORP) online monitoring instrument.

In an embodiment, the biological filtration unit is a biological aerated filter. The pollutants are removed through biodegradation, physical filtration, and adsorption through the filler filled in the biological aerated filter and the biofilm.

The second ion exchange unit is used to further remove heavy metal ions in water, for example, copper ions and nickel ions. After meeting the industrial water pollutant discharge standard, water is discharged to avoid salt accumulation in the whole treatment process, realizing the reduction of PCB industrial wastewater.

In an embodiment, a method for treating PCB wastewater includes the following steps.

(S1) The production system produces production wastewater. The domestic wastewater is collected from the living system.

(S2) The production wastewater and the domestic wastewater are pretreated separately to obtain primary treated wastewater. The primary treated wastewater enters the biochemical system or the recovery system.

(S3) The primary treated wastewater is treated by the biochemical system to obtain secondary treated wastewater, and the secondary treated wastewater is collected to the recovery system for recycling.

(S4) The secondary treated wastewater is treated by the recovery system to obtain process water and domestic water, and concentrated water is generated at the same time. The process water enters the production system for use, and the domestic water enters the living system for use.

(S5) The concentrated water enters a concentrated water treatment system for treatment to meet a discharge standard.

In an embodiment, in step (S2), the pretreating includes a first pretreatment and a second pretreatment.

The first pretreatment includes the following steps.

(S211) The high-concentration organic wastewater, low-concentration organic wastewater, ink wastewater, complex copper wastewater, copper-ammonia wastewater, and domestic wastewater are treated respectively.

The treated high-concentration organic wastewater is mixed with the low-concentration organic wastewater followed by another treatment.

(S212) The treated organic wastewater, treated ink wastewater, treated complex copper wastewater, treated copper-ammonia wastewater, and treated domestic wastewater are mixed to obtain first mixed wastewater, and the first mixed wastewater is treated followed by feeding to the biochemical system.

The second pretreatment includes the following steps.

(S221) The copper-containing wastewater, nickel-containing wastewater, cyanide-containing wastewater, and silver-containing wastewater are treated respectively.

The treated cyanide-containing wastewater is mixed with the nickel-containing wastewater followed by another treatment.

(S222) The treated cyanide-containing wastewater, treated copper-containing wastewater, treated nickel-containing wastewater, and treated silver-containing wastewater are mixed to obtain second mixed wastewater, and the second mixed wastewater is treated followed by feeding to the recovery system.

In an embodiment, in step (S211), the high-concentration organic wastewater is treated through steps as follows.

The treatment of the high-concentration organic wastewater includes: collecting the high-concentration organic wastewater followed by feeding to the acidification tank A; adjusting the high-concentration organic wastewater to pH 2~4 with an acid followed by stirring and feeding to the coagulation tank A; adding an alkali to adjust pH; and adding a first coagulant, and after undergoing sedimentation in the sedimentation tank A, allowing a supernatant to enter the low-concentration organic wastewater treatment unit.

The low-concentration organic wastewater is treated through steps of: collecting the low-concentration organic wastewater and the supernatant followed by mixing to obtain mixed organic wastewater; subjecting the mixed organic wastewater to Fenton oxidation in the reaction tank B for 1~2 h to remove organic matters, with pH controlled to 2~4; adding a reducing agent followed by feeding to enter the reactor B; and adding a second coagulant in the reactor B followed by sedimentation to collect an effluent to the mixed wastewater treatment unit.

Fenton oxidation is a wastewater treatment method using Fenton reagent, which uses ferrous ions ($Fe^{2+}$) as catalyst and hydrogen peroxide for chemical oxidation.

The ink wastewater is treated through steps of: collecting the ink wastewater; and treating the ink wastewater in the deinking tank C, adding an amphoteric coagulant followed by feeding to the sedimentation tank C for precipitation.

The complex copper wastewater is treated through steps of: collecting the complex copper wastewater; adding a sulfide as a breaking agent in a decomplexation tank D; adding an alkali liquor in the pH adjustment tank D to adjust pH to 8~9; adding a third coagulant to the reactor D for precipitation; and collecting an effluent to the mixed wastewater treatment unit.

The copper-ammonia wastewater is treated through steps of: collecting the copper-ammonia wastewater; adding an acid to the pH adjustment tank E to adjust pH to 4~7 followed by stirring and feeding to the reaction tank E; mixing the copper-ammonia wastewater with NaClO followed by reaction for 30~60 min; adjusting pH to 8~9, and adding a fourth coagulant to the reactor E for coagulation and precipitation; and collecting an effluent to the mixed wastewater treatment unit.

The domestic wastewater is treated through steps of: filtering the domestic wastewater through the coarse screen and the fine screen followed by oil removal in an oil-separation tank and sedimentation in the sedimentation tank F; and collecting an effluent to the mixed wastewater treatment unit.

In an embodiment, in step (S212), the treatment of the first mixed wastewater includes steps as follows.

The first mixed wastewater is treated through steps of: collecting the treated organic wastewater, the treated ink wastewater, the treated complex copper wastewater, the treated copper-ammonia wastewater, and the treated domestic wastewater followed by mixing to obtain the first mixed wastewater in the collection tank G; adjusting pH to 7~9 in the pH adjustment tank G followed by feeding to the coagulation tank G; and adding ferrous ions and poly aluminum chloride (PAC) for coagulation followed by precipitation in the sedimentation tank G; and collecting an effluent to the biochemical system. Specifically, PAC is an inorganic substance, and inorganic polymer coagulant, for example, polyaluminum. Ferrous ions can be selected from $Fe^{2+}$ soluble salts, such as ferrous sulfate, ferrous chloride or ferrous nitrate.

In an embodiment, in step (S221), the cyanide-containing wastewater is treated through steps of: collecting the cyanide-containing wastewater; adding an alkali to the pH adjustment tank K to adjust pH to 9~11; adding hydrogen peroxide to the reaction tank K followed by reaction for 20~40 min; and collecting an effluent to the collection tank J.

The nickel-containing wastewater is treated through steps of: collecting the nickel-containing wastewater in the collection tank; adding an acid to the pH adjustment tank J to adjust pH to 2~3; adding Fenton reagent or NaClO to the decomplexation tank J followed by reaction for 50~70 min; stirring and feeding to the reactor J; adjusting pH to 10~11, and adding a fifth coagulant to the reactor followed by precipitation for 10~30 min; and collecting a supernatant to a second mixed wastewater treatment unit.

The copper-containing wastewater is treated through steps of: collecting the copper-containing wastewater followed by feeding to the reactor I; adjusting pH to 8~9; adding a sixth coagulant followed by precipitation for 10~15 min; and collecting a supernatant to the second mixed wastewater treatment unit.

The silver-containing wastewater is treated through steps of: collecting the silver-containing wastewater; adding NaOH at the front end of the reactor H followed by mixing the pipeline mixer, adding a seventh coagulant for precipitation; and collecting a supernatant to the second mixed wastewater treatment system.

In an embodiment, the step (S222) includes: collecting the treated cyanide-containing wastewater, nickel-containing wastewater, copper-containing wastewater, and silver-containing wastewater in the second mixed wastewater treatment unit to produce the second mixed wastewater; allowing the second mixed wastewater to flow into the reaction tank L, and adding ferrous sulfate under acidic conditions for reaction; adjusting pH to 8~10 in the pH adjustment tank L; adding sodium sulfide to the coagulation tank L for reaction; adding an eighth coagulant followed by reaction 10~15 min; and feeding to the sedimentation tank L for precipitation; and collecting a supernatant to the recovery system.

In the embodiments of the present disclosure, the acid used to adjust the pH is selected from sulfuric acid. The alkali is selected from sodium hydroxide. Coagulants are selected from PAC and Polyacrylamide (PAM). The sulfide specifically refers to sodium sulfide.

In an embodiment, in step (S3), the "treating the primary treated wastewater by the biochemical system" includes the following steps.

(S31) Organic matter is decomposed by anaerobic fermentation to produce a preliminarily-decomposed product. Organic matter is first treated in anaerobic tank, and then treated in anoxic tank.

(S32) The preliminarily-decomposed product is decomposed by aerobic fermentation.

(S33) Filtration is performed by using a membrane bioreactor (MBR) tank.

In an embodiment, in step (S4), the "treating the secondary treated wastewater by the recovery system" includes the following steps.

(S41) The secondary treated wastewater is collected followed by feeding to an ultrafiltration treatment equipment.

(S42) An ultrafiltered effluent enters a primary reverse osmosis treatment unit. The wastewater produced from the primary reverse osmosis treatment unit enters the concentrated water treatment system.

(S43) The purified water produced from the primary reverse osmosis treatment unit enters the secondary reverse osmosis treatment unit to obtain the process water.

In the ultrafiltration treatment equipment, due to maintenance operation, the backwash wastewater generated returns to the low-concentration organic wastewater in the pretreatment system. The waste acid and waste alkali generated by chemical cleaning are recycled into the waste acid collection tank and the waste alkali collection tank, respectively.

In an embodiment, in step (S5), the concentrated water is treated through the following steps.

(S51) The concentrated water is collected to perform ozone and hydrogen peroxide treatment in an oxidation reaction unit to preliminarily-treated concentrated water.

(S52) The preliminarily-treated concentrated water reacts in a biological filter to obtain secondarily-treated concentrated water.

(S53) The heavy metal ions are removed from the secondarily-treated concentrated water with an ion-exchange resin to meet the discharge standard.

Specifically, the primary concentrated water produced from the primary reverse osmosis treatment unit has removed most of the biodegradable organic matter. The remaining organic matters are mostly difficult to biodegrade. At this stage, the water belongs to high salinity refractory wastewater, that is, concentrated water. After collection, the concentrated water is fed to the reaction tank of the oxidation reaction unit to react with ozone, transforming the refractory organic matter into easily-biodegradable small molecule matter and improving the biodegradability of wastewater. At the same time, in order to improve the utilization rate and treatment efficiency of ozone, hydrogen peroxide is added. The addition ratio of hydrogen peroxide is determined according to the actual situation. An ORP on-line monitoring instrument is provided at the end of the reaction tank, and sodium bisulfite is added as a reducing agent to remove residual ozone in the water. Then the effluent enters the biological aerated filter of the biological filtration unit, and remove pollutants through biodegradation, physical filtration and adsorption through the filler filled in the filter body and the attached biofilm. Optionally, the reaction tank can also remove residual ozone in the water through large-flow aeration. Correspondingly, the biological aerated filter does not need to perform the secondary aeration and oxygenation and is more conducive to construct a microenvironment with low dissolved oxygen in the filler of the biological aerated filter, to achieve a better removal effect of total nitrogen. The effluent from the biological aerated filter enters the weak acid cation bed unit under pressure by the pump, and the heavy metal ions in the water are removed by ion exchange resin, and the heavy metal ions mainly include copper ions and nickel ions. Finally, after meeting the industrial water pollutant discharge standard, water is discharged to ensure that avoids the salt accumulation in the whole process of treatment, realizing the reduction treatment of PCB wastewater.

The wastewater generated by the biological filtration unit during the backwash process enters the domestic wastewater unit in the pretreatment system.

The wastewater generated by the ion exchange resin unit during the resin regeneration process enters the copper-containing wastewater treatment unit or the nickel-containing wastewater treatment unit in the pretreatment system.

The treatment system in the embodiments of the present invention manages simultaneously water resource utilization in the PCT industrial factory, monitors in real time the pretreatment system, biochemical system, wastewater grading and recovery system, and concentrated water treatment system. The treatment system can be provided with a plurality of online detection instruments, provided with automatic control programs according to each treatment tank and equipment conditions, such as level gauges, flow meters, pH meters, turbidity meters, and conductivity meters, for unified management and timely feedback. Thus, the interaction between different units and different systems is avoided, which avoids disordered system management, improves the quality of produced water, and prolongs the service life of equipment.

The PCB wastewater treatment system and method provided herein are applied to a PCB manufacture in Jiangsu Province, China, and after the one-year practical operation, the collected experimental data are shown in Table 1.

TABLE 1

Experimental data of practical application of the PCB wastewater treatment system and method

| | Before the application of the system and method | After the application of the system and method |
| --- | --- | --- |
| Tap water consumption | 12000 t/d | 12000 t/d |
| Waste water discharge | 13000 t/d | 3500 t/d |
| Reclaimed water recovery rate (%) | 10% | 70% |

As shown in Table 1, by using the treatment system in the present disclosure, the wastewater discharge is significantly reduced, and the recovery rate of reclaimed water is improved.

Described above are merely illustrative to enable those skilled in the art to understand or implement the technical solutions of the present disclosure. Though the present disclosure has been described in detail above with reference to the embodiments, various modifications, variations and replacements can still be made by those skilled in the art to the technical solutions disclosed herein. It should be understood that those modifications, variations and replacements made without departing from the spirit or scope of the present disclosure. shall fall within the scope of the disclosure defined by the appended claims.

What is claimed is:

1. A system for treating printed circuit board (PCB) wastewater, comprising:
    a production system;
    a pretreatment system;
    a biochemical system;
    a recovery system;
    a concentrated water treatment system; and
    a living system;
    wherein the production system is configured to produce process water and auxiliary production water from tap water;
    the pretreatment system is configured to pretreat wastewater;
    the biochemical system is configured to decompose pretreated wastewater;
    the recovery system is configured to treat wastewater from the pretreatment system and the biochemical system to obtain the process water, treat waste to form concentrated water, and discharge the concentrated water into the concentrated water treatment system;
    the concentrated water treatment system is configured to treat the concentrated water to meet a discharge standard;
    an output end of the production system and an output end of the living system are connected to a first input end of the pretreatment system; a first output end of the pretreatment system is connected to an input end of the biochemical system; and an output end of the biochemical system is connected to a first input end of the recovery system;
    a second output end of the pretreatment system is connected to a second input end of the recovery system; a first output end of the recovery system is connected to the concentrated water treatment system; and a second output end of the recovery system is connected to an input end of the production system;

a first output end of the concentrated water treatment system is configured for wastewater discharge; a second output end of the concentrated water treatment system and a third output end of the recovery system are connected to a second input end of the pretreatment system;

the pretreatment system comprises a first pretreatment subsystem and a second pretreatment subsystem;

the first pretreatment subsystem comprises a first organic wastewater treatment unit, a second organic wastewater treatment unit, an ink wastewater treatment unit, a complex copper wastewater treatment unit, a copper-ammonia wastewater treatment unit, a domestic wastewater treatment unit, and a first mixed wastewater treatment unit;

an output end of the first organic wastewater treatment unit is connected to an input end of the second organic wastewater treatment unit;

an output end of the second organic wastewater treatment unit, an output end of the ink wastewater treatment unit, an output end of the complex copper wastewater treatment unit, an output end of the copper-ammonia wastewater treatment unit and an output end of the domestic wastewater treatment unit are connected with an input end of the first mixed wastewater treatment unit;

an output end of the first mixed wastewater treatment unit is connected to the input end of the biochemical system;

the second pretreatment subsystem comprises a copper-containing wastewater treatment unit, a nickel-containing wastewater treatment unit, a cyanide-containing wastewater treatment unit, a silver-containing wastewater treatment unit and a second mixed wastewater treatment unit;

an output end of the cyanide-containing wastewater treatment unit is connected to an input end of the nickel-containing wastewater treatment unit;

an output end of the copper-containing wastewater treatment unit, an output end of the nickel-containing wastewater treatment unit, and an output end of the silver-containing wastewater treatment unit are connected to an input end of the second mixed wastewater treatment unit; and an output end of the second mixed wastewater treatment unit is connected to the second input end of the recovery system;

the first organic wastewater treatment unit is configured to treat high-concentration organic wastewater to reduce chemical oxygen demand (COD) of the high-concentration organic wastewater to 800~2000 mg/L;

the second organic wastewater treatment unit is configured to treat low-concentration organic wastewater to reduce COD of the low-concentration organic wastewater to 100~500 mg/L;

the ink wastewater treatment unit is configured to treat ink wastewater to reduce COD of the ink wastewater to 400~800 mg/L;

the complex copper wastewater treatment unit is configured to treat complex copper wastewater to reduce copper content of the complex copper wastewater to 0.5 mg/L;

the copper-ammonia wastewater treatment unit is configured to treat copper-ammonia wastewater to reduce copper content of the copper-ammonia wastewater to 0.5 mg/L;

the domestic wastewater treatment unit is configured to treat domestic wastewater;

the first organic wastewater treatment unit comprises a first collection tank, an acidification tank, a first coagulation tank, and a first sedimentation tank connected in sequence;

the second organic wastewater treatment unit comprises a second collection tank, a first reaction tank, a first pH adjustment tank, and a first reactor connected in sequence; and the first reactor is configured for coagulation and precipitation;

the ink wastewater treatment unit comprises a third collection tank, a deinking tank, and a second sedimentation tank connected in sequence;

the complex copper wastewater treatment unit comprises a fourth collection tank, a first decomplexation tank, a second pH adjustment tank, and a second reactor connected in sequence; and the second reactor is configured for coagulation and precipitation;

the copper-ammonia wastewater treatment unit comprises a fifth collection tank, a third pH adjustment tank, a second reaction tank, and a third reactor connected in sequence; and the third reactor is configured for coagulation and precipitation;

the domestic wastewater treatment unit comprises a coarse screen, a fine screen, an oil separation tank, and a third sedimentation tank connected in sequence;

the first mixed wastewater treatment unit comprises a sixth collection tank, a fourth pH adjustment tank, a second coagulation tank, a fourth sedimentation tank, and a fifth pH adjustment tank connected in sequence;

the cyanide-containing wastewater treatment unit is configured to treat cyanide-containing wastewater to reduce $CN^-$ content to 0.05 mg/L or less;

the nickel-containing wastewater treatment unit is configured to treat nickel-containing wastewater to reduce $Ni^{2+}$ content to 0.075 mg/L or less;

the copper-containing wastewater treatment unit is configured to treat copper-containing wastewater to reduce $Cu^{2+}$ content to 0.5 mg/L or less;

the silver-containing wastewater treatment unit is configured to treat silver-containing wastewater to reduce $Ag^+$ content to 0.075 mg/L or less;

the cyanide-containing wastewater treatment unit comprises a seventh collection tank, a sixth pH adjustment tank, and a third reaction tank connected in sequence;

the nickel-containing wastewater treatment unit comprises an eighth collection tank, a seventh pH adjustment tank, a second decomplexation tank, and a fourth reactor connected in sequence; and the third reaction tank is connected to the eighth collection tank;

the silver-containing wastewater treatment unit comprises a ninth collection tank and a fifth reactor connected in sequence;

the copper-containing wastewater treatment unit comprises a tenth collection tank and a sixth reactor connected in sequence; and the second mixed wastewater treatment unit comprises an eleventh collection tank, a fourth reaction tank, an eighth pH adjustment tank, a third coagulation tank, and a fifth sedimentation tank connected in sequence.

2. The system of claim 1, wherein the biochemical system comprises an anaerobic unit, an anoxic unit, an aerobic unit, and a membrane bio-reactor (MBR) tank connected in sequence;

the recovery system comprises a filtration unit, a first ion exchange unit, and a reverse osmosis treatment unit; and the concentrated water treatment system comprises a concentrated water collection unit, an oxidation reaction unit, a biological filtration unit, and a second ion exchange unit connected in sequence.

3. A method for treating printed circuit board (PCB) wastewater, comprising:
(S1) collecting production wastewater from a production system; and collecting domestic wastewater from a living system;
(S2) pretreating the production wastewater and the domestic wastewater separately to obtain primary treated wastewater; and allowing the primary treated wastewater to enter a biochemical system or a recovery system;
(S3) treating the primary treated wastewater by the biochemical system to obtain secondary treated wastewater, and collecting the secondary treated wastewater to the recovery system;
(S4) treating the secondary treated wastewater by the recovery system to obtain process water and domestic water, and generating concentrated water at the same time;
wherein the process water enters the production system for use; and the domestic water enters the living system for use; and
(S5) allowing the concentrated water to enter a concentrated water treatment system for treatment to meet a discharge standard;
wherein in step (S2), the pretreating comprises a first pretreatment and a second pretreatment;
the first pretreatment comprises:
(S211) treating high-concentration organic wastewater, low-concentration organic wastewater, ink wastewater, complex copper wastewater, copper-ammonia wastewater, and domestic wastewater, respectively; and
combining treated high-concentration organic wastewater with the low-concentration organic wastewater;
(S212) mixing treated organic wastewater, treated ink wastewater, treated complex copper wastewater, treated copper-ammonia wastewater, and treated domestic wastewater to obtain first mixed wastewater, and treating the first mixed wastewater followed by feeding to the biochemical system;
the second pretreatment comprises:
(S221) treating copper-containing wastewater, nickel-containing wastewater, cyanide-containing wastewater, and silver-containing wastewater, respectively; and
combining treated cyanide-containing wastewater with the nickel-containing wastewater; and
(S222) mixing treated cyanide-containing wastewater, treated copper-containing wastewater, treated nickel-containing wastewater, and treated silver-containing wastewater to obtain second mixed wastewater, and treating the second mixed wastewater followed by feeding to the recovery system;
in step (S211), the high-concentration organic wastewater is treated through steps of:
collecting the high-concentration organic wastewater followed by feeding to an acidification tank; adjusting the high-concentration organic wastewater to pH 2~4 with an acid followed by stirring and feeding to a first coagulation tank; adding an alkali to adjust pH; and adding a first coagulant, and after undergoing sedimentation in a first sedimentation tank, allowing a supernatant to enter a low-concentration organic wastewater treatment unit;
the low-concentration organic wastewater is treated through steps of:
collecting the low-concentration organic wastewater and the supernatant followed by mixing to obtain mixed organic wastewater; subjecting the mixed organic wastewater to Fenton oxidation in a first reaction tank for 1~2 h to remove organic matters, with pH controlled to 2~4; adding a reducing agent followed by feeding to enter a first reactor; and adding a second coagulant in the first reactor followed by sedimentation to collect an effluent to a mixed wastewater treatment unit;
the ink wastewater is treated through steps of:
collecting the ink wastewater, and treating the ink wastewater in a deinking tank; and adding an amphoteric coagulant, followed by feeding to a second sedimentation tank for precipitation;
the complex copper wastewater is treated through steps of:
collecting the complex copper wastewater; adding a sulfide as a breaking agent in a decomplexation tank; adding an alkali liquor in a pH adjustment tank to adjust pH to 8~9; adding a third coagulant to a second reactor for precipitation; and collecting an effluent to the mixed wastewater treatment unit;
the copper-ammonia wastewater is treated through steps of:
collecting the copper-ammonia wastewater; adding an acid to a second pH adjustment tank to adjust pH to 4~7 followed by stirring and feeding to a second reaction tank; mixing the copper-ammonia wastewater with NaClO followed by reaction for 30~60 min; adjusting pH to 8~9, and adding a fourth coagulant to a third reactor for coagulation and precipitation; and collecting an effluent to the mixed wastewater treatment unit; and
the domestic wastewater is treated through steps of:
filtering the domestic wastewater through a coarse screen and a fine screen followed by oil removal in an oil-separation tank and sedimentation in a third sedimentation tank; and collecting an effluent to the mixed wastewater treatment unit;
in step (S212), the treatment of the first mixed wastewater comprises: collecting the treated organic wastewater, the treated ink wastewater, the treated complex copper wastewater, the treated copper-ammonia wastewater, and the treated domestic wastewater followed by mixing to obtain the first mixed wastewater in a collection tank; adjusting pH to 7~9 in a third pH adjustment tank followed by feeding to a second coagulation tank; and adding ferrous ions and poly aluminum chloride (PAC) for coagulation followed by precipitation in a fourth sedimentation tank; and
collecting an effluent to the biochemical system;
in step (S221), the cyanide-containing wastewater is treated through steps of:
collecting the cyanide-containing wastewater; adding an alkali to a fourth pH adjustment tank to adjust pH to 9~11; adding hydrogen peroxide to a fourth reaction tank followed by reaction for 20~40 min; and collecting an effluent to a collection tank;
the nickel-containing wastewater is treated through steps of:
collecting the nickel-containing wastewater in the collection tank; adding an acid to a fifth pH adjustment tank to adjust pH to 2~3; adding Fenton reagent or NaClO to a second decomplexation tank followed by reaction for 50~70 min, stirring and feeding to a fourth reactor; adjusting pH to 10~11, and adding a fifth coagulant to the fourth reactor followed by precipitation for 10~30 min; and collecting a supernatant to a second mixed wastewater treatment unit;

the copper-containing wastewater is treated through steps of:

collecting the copper-containing wastewater followed by feeding to a fifth reactor; adjusting pH to 8~9; adding a sixth coagulant followed by precipitation for 10~15 min; and collecting a supernatant to the second mixed wastewater treatment unit; and the silver-containing wastewater is treated through steps of:

collecting the silver-containing wastewater; adding NaOH at a front end of a sixth reactor followed by mixing by a pipeline mixer, adding a seventh coagulant for precipitation; and collecting a supernatant to the second mixed wastewater treatment system; and step (S222) comprises:

collecting the treated cyanide-containing wastewater, nickel-containing wastewater, copper-containing wastewater and silver-containing wastewater in the second mixed wastewater treatment unit to produce the second mixed wastewater;

allowing the second mixed wastewater to flow into a fifth reaction tank, and adding ferrous sulfate under acidic conditions for reaction; adjusting pH to 8~10 in a sixth pH adjustment tank; adding sodium sulfide to a third coagulation tank for reaction;

adding an eighth coagulant followed by reaction for 10~15 min and feeding to a fifth sedimentation tank for precipitation; and collecting a supernatant to the recovery system.

4. The method of claim 3, wherein in step (S3), the "treating the primary treated wastewater by the biochemical system" comprises:

(S31) decomposing organic matter by anaerobic fermentation to produce a preliminarily-decomposed product;

(S32) decomposing the preliminarily-decomposed product by aerobic fermentation; and (S33) performing filtration by using a membrane bioreactor (MBR) tank;

in step (S4), the "treating the secondary treated wastewater by the recovery system" comprises:

(S41) collecting the secondary treated wastewater followed by feeding to an ultrafiltration treatment equipment;

(S42) allowing an ultrafiltered effluent to enter a primary reverse osmosis treatment unit; and allowing wastewater produced from the primary reverse osmosis treatment unit to enter the concentrated water treatment system; and (S43) allowing purified water produced from the primary reverse osmosis treatment unit to enter a secondary reverse osmosis treatment unit to obtain the process water.

5. The method of claim 3, wherein in step (S5), the concentrated water is treated through steps of:

(S51) collecting the concentrated water; and performing ozone and hydrogen peroxide treatment in an oxidation reaction unit to obtain preliminarily-treated concentrated water;

(S52) subjecting the preliminarily-treated concentrated water to reaction in a biological filter to obtain secondarily-treated concentrated water; and (S53) removing heavy metal ions from the secondarily-treated concentrated water with an ion-exchange resin to meet the discharge standard.

* * * * *